United States Patent

[11] 3,544,076

[72] Inventors Ivan Gavrilovich Zenkovich
ul, Kerova 16, KV,39, Vitebsk;
Nikolai Mitrofanovich Kolenko,
Vozdukhoflotsky prospekt, 55a, KV. 57,
Kiev, U.S.S.R.
[21] Appl. No. 692,176
[22] Filed Dec. 20, 1967
[45] Patented Dec. 1, 1970

[54] APPARATUS FOR THE PREPARATION OF PASTY MIXTURES CONTAINING METALS
4 Claims, 1 Drawing Fig.
[52] U.S. Cl. .................................................. 259/2,
259/171
[51] Int. Cl. ...................................................... B01f 15/02
[50] Field of Search.......................................... 259/2, 12,
29, 54, 72, 171, 1, 162, 173 (Vib-Sonic); 241/175

[56] References Cited
UNITED STATES PATENTS
2,133,170  10/1938  Johnson .................. 259/171
3,151,958  10/1964  Bodine .................... 259/(Vib-Sonic)
3,255,999  6/1966  Weston ................... 259/2
1,414,648  5/1922  Jaeger .................... 259/162
2,591,083  4/1952  Maier ..................... 259/1(UX)
2,916,265  12/1959  Towne .................... 259/1

FOREIGN PATENTS
362,004  6/1962  Switzerland ............. 259/(Vib-Sonic)

*Primary Examiner*—Edward L. Roberts
*Attorney*—Waters, Roditi, Schwartz & Nissen ABSTRACT: Apparatus for the preparation of pasty mixtures especially metal-containing pastes used for conductive coatings on ceramic parts, said apparatus including a working chamber having tapering walls of conical shape which narrows upwardly and a floor which is constituted by an emitter of ultrasonic oscillations, the arrangement being such that when constituents are introduced into the chamber and the emitter is operated, oscillations are produced which act on the constituents to produce a uniform fineness of grind and a viscosity of the mixture which remains stable over a long period of time.

Patented Dec. 1, 1970 3,544,076
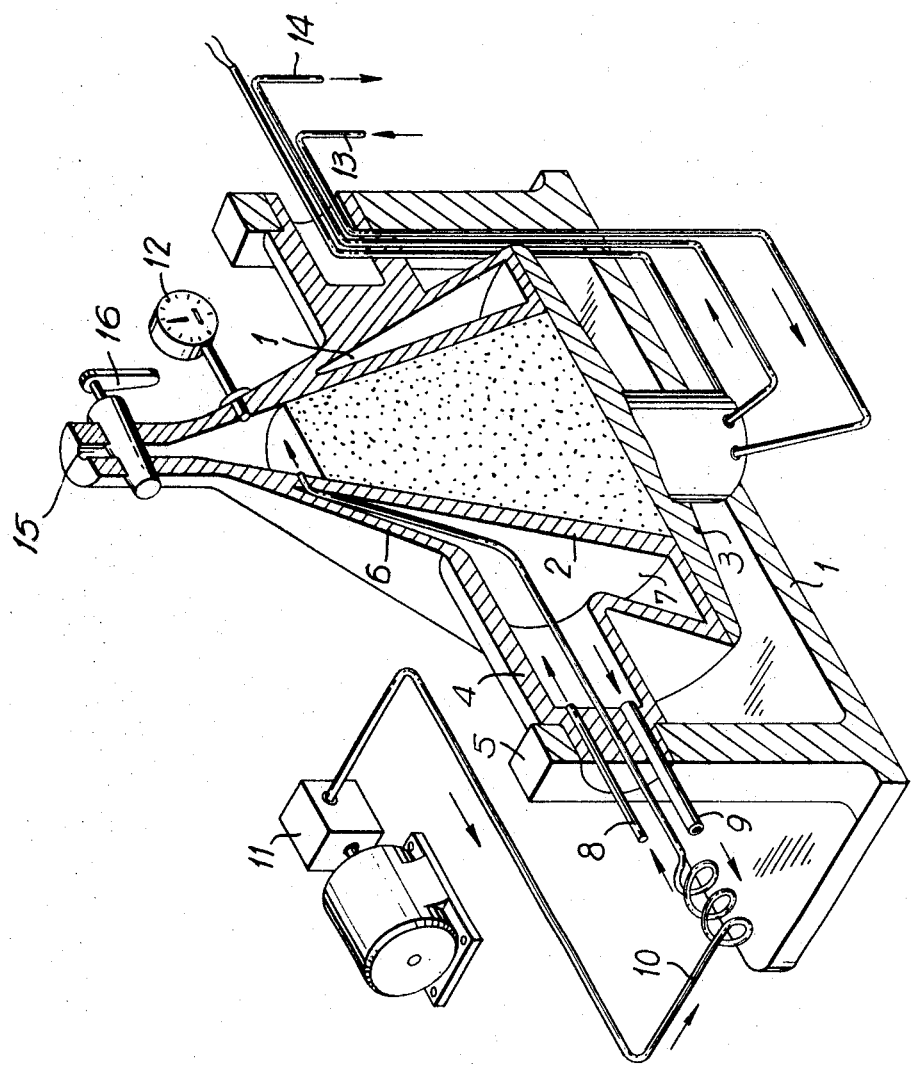

APPARATUS FOR THE PREPARATION OF PASTY MIXTURES CONTAINING METALS

The present invention relates to plants for the preparation of pasty mixtures, particularly metal-containing mixtures used in the electronic and electrical industries for depositing conductive coatings on various ceramic parts and products.

At present, metal-containing pastes are industrially produced in plants in which the initial components are ground and mixed in airtight rotating porcelain drums by means of porcelain balls loaded into the drums together with the initial materials. These plants fail to produce pastes with a uniform fineness of grind and a viscosity which remains stable within a lengthy period of time.

Other disadvantages of the known plants include slowness of grinding and mixing process, i.e. as much as 72 hours and, consequently, a low capacity of the plants as well as the need for periodical sorting and washing of the balls and drums.

There have been attempts to utilize ultrasonic oscillations for preparing various liquid and pasty mixtures, but these attempts have been confined to laboratory conditions and have not been carried into industrial use.

It is an object of the present invention to eliminate the aforesaid disadvantages.

It is a further and more specific object of the invention to provide a high-capacity plant for preparing various pasty mixtures by subjecting the mixture components to the effect of ultrasonic oscillations, the obtained mixtures being characterized by a uniform fineness of grind, a viscosity remaining stable for a long time, and the absence of undue foreign matter.

These objects are accomplished by providing a plant for the preparation pasty mixtures by the action of ultrasonic oscillations, said plant, according to the invention, consisting of a tiltable working chamber tapering upward and installed on a frame, the bottom of said chamber being constituted by an emitter of supersonic oscillations which act on the mixture components loaded into the chamber.

The process is speeded up by connecting a gas pipe to the upper part of the working chamber for building up an overpressure in the chamber.

In some cases, particularly while preparing metal-containing pastes, it expedient to provide a suitable means for cooling the working chamber walls from outside.

Hereinbelow, the invention will be described in detail by way of example with reference to the sole figure of the accompanying drawing showing a sectionalized view of the plant for the preparation of metal-containing pastes.

The plant illustrated in the drawing consists of a working chamber 2 tapering upwards, installed on a frame 1, and an emitter 3 of ultrasonic oscillations, said emitter serving as the bottom of the chamber 2.

The working chamber 2 is articulated to the uprights 5 of the frame 1 by means of journals 4 and can be tilted downwardly.

The working chamber 2 is provided with a second side wall 6 which, together with its main wall, forms a space 7 through which cold water supplied by pipes 8 and 9 circulates.

Compressed air is supplied into the upper part of the working chamber 2 through a pipe 10 from a compressor 11. The overpressure created in the working chamber 2 is registered on a pressure gauge 12.

The emitter 3 of ultrasonic oscillations is also fitted with a water cooling system which is supplied by pipes 13 and 14.

The plant functions as follows.

The initial components for preparing the metal-containing paste are loaded into the working chamber 2 through the throat 15, the cock 16 being held open; the chamber is loaded almost to capacity and only a small space is left empty for creating an air or gas cushion inside.

As soon as the chamber is loaded, the cock 16 is closed. Then cold water is supplied for cooling the walls of the working chamber 2 and the emitter 3. Then the compressor 11 is started for supplying compressed air into the working chamber 2. As soon as the required overpressure is built up in the working chamber 2, the compressor 11 is stopped and the emitter 3 is started.

The ultrasonic oscillations travelling upward from the chamber bottom pass through the mass of the mixture components, reach the inclined walls of the chamber and, being reflected by these walls, again pass through the mass of the components. This creates a high concentration of ultrasonic oscillations oscillations in the components; these oscillations cause violent cavitation in the liquid components of the paste which start moving at high speeds. Cavitation and rapid movement of the liquid components lead to intensive comminution of the solid components and mixing of all the components of the paste being prepared. This process lasts from 1 to 3 hours.

On completion of the working cycle, the emitter 3 is turned off, as is the water supply, and the overpressure is released in the working chamber 2. The ready paste is emptied from the working chamber 2 through the throat 15 with the cock 16 open, by tilting the chamber on the uprights 5 of the frame 1.

The metal-containing paste produced in the present plant is characterized by a uniform fineness of grind, with grains ranging from 0.2 to 1 micron in size and a viscosity remaining practically unchanged over one or two days.

The capacity of the plant reaches 20—25 liters of paste per work shift.

While a specific preferable embodiment of the invention has been illustrated in the drawing and disclosed in the description, it should be borne in mind that other versions of the plant with relation to shape, size and layout of individual elements may occur to those skilled in the art. For example, the working chamber shown in the drawing may have a different shape, and the overpressure in the chamber may be built up in a different manner, but all these changes and modifications can be resorted to without departing from the spirit and scope of the invention as defined in the appended claims.

We claim:

1. A plant for the preparation of pasty mixtures comprising a frame; a working chamber on said frame and having a bottom and upwardly tapering walls with external cooling means on the walls of said chamber; means for introducing constituents to be mixed into said chamber; an emitter of ultrasonic oscillations constituting the bottom of the working chamber and emitting oscillations acting on the constituents loaded into said working chamber; said walls of said chamber being of a construction which in consequence of the upper taper ensures a uniform distribution of ultrasonic energy throughout the volume of the mixture being worked in said chamber, and a pipe in the walls at the top of the working chamber for building up an overpressure inside the chamber.

2. A plant according to claim 1 comprising means supporting said chamber from the frame for tilting.

3. A plant according to claim 1 wherein said walls define a cone which narrows upwardly.

4. A plant as claimed in claim 1 wherein said external cooling means on said chamber comprises outer walls on said chamber forming a cavity with the walls of the chamber and means for circulating a cooling fluid in said cavity to cool the walls of said chamber.